United States Patent
Balboni et al.

(10) Patent No.: US 10,844,885 B2
(45) Date of Patent: Nov. 24, 2020

(54) SYSTEM FOR RECOVERING ENERGY FROM A HYDRAULIC ACTUATOR

(71) Applicant: DANA ITALIA S.R.L., Arco (IT)

(72) Inventors: Luca Balboni, Rovereto (IT); Davide Moser, Trento (IT); Fabrizio Zendri, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 16/311,871

(22) PCT Filed: Jul. 5, 2017

(86) PCT No.: PCT/EP2017/066843
§ 371 (c)(1),
(2) Date: Dec. 20, 2018

(87) PCT Pub. No.: WO2018/007474
PCT Pub. Date: Jan. 11, 2018

(65) Prior Publication Data
US 2019/0203746 A1    Jul. 4, 2019

(30) Foreign Application Priority Data
Jul. 7, 2016   (EP) .................................... 16425067

(51) Int. Cl.
*F15B 1/027*   (2006.01)
*F15B 21/14*   (2006.01)
(Continued)

(52) U.S. Cl.
CPC .............. *F15B 21/14* (2013.01); *B66C 23/54* (2013.01); *E02F 9/2217* (2013.01);
(Continued)

(58) Field of Classification Search
CPC ........... F15B 1/021; F15B 1/024; F15B 1/027
See application file for complete search history.

(56) References Cited

U.S. PATENT DOCUMENTS

| 4,520,840 A | 6/1985 | Michel |
| 7,269,944 B2 | 9/2007 | Zhang |

(Continued)

FOREIGN PATENT DOCUMENTS

| CN | 2076972 | 5/1991 |
| CN | 1702320 | 11/2005 |

(Continued)

OTHER PUBLICATIONS

European Patent Office, International Search Report with written Opinion issue in application PCT/EP2017/066843, dated Oct. 26, 2017, 11 pages, European Patent Office, Rijswijk Netherlands.

*Primary Examiner* — F Daniel Lopez
(74) *Attorney, Agent, or Firm* — McCoy Russell LLP

(57) ABSTRACT

A system for recovering energy from a hydraulic actuator and to a method of operating the system are described. The system may have a hydraulic actuator and a source of hydraulic pressure, comprising a hydraulic pump, in fluid communication with the hydraulic actuator for pressurizing the hydraulic actuator. The system may also have a hydraulic accumulator assembly for selectively absorbing energy from the hydraulic actuator or via the hydraulic actuator. The system may also have a first one-way valve configured to provide fluid communication between the hydraulic actuator and the hydraulic accumulator assembly. The first one-way valve may be configured to permit a flow of fluid through the first one-way valve from the hydraulic actuator to the hydraulic accumulator assembly. The first one-way valve may also be configured to block a flow of fluid through the first one-way valve from the hydraulic accumulator assembly to the hydraulic actuator.

15 Claims, 6 Drawing Sheets

(51) Int. Cl.
*E02F 9/22* (2006.01)
*B66C 23/00* (2006.01)
*F15B 11/10* (2006.01)
*F16H 61/4096* (2010.01)

(52) U.S. Cl.
CPC .......... *E02F 9/2225* (2013.01); *E02F 9/2267* (2013.01); *E02F 9/2271* (2013.01); *E02F 9/2282* (2013.01); *F15B 1/027* (2013.01); *F15B 11/10* (2013.01); *E02F 9/2285* (2013.01); *E02F 9/2296* (2013.01); *F15B 2211/205* (2013.01); *F15B 2211/212* (2013.01); *F15B 2211/30505* (2013.01); *F15B 2211/411* (2013.01); *F15B 2211/428* (2013.01); *F15B 2211/50563* (2013.01); *F15B 2211/50581* (2013.01); *F15B 2211/5756* (2013.01); *F15B 2211/7053* (2013.01); *F15B 2211/7058* (2013.01); *F15B 2211/7142* (2013.01); *F15B 2211/88* (2013.01); *F16H 61/4096* (2013.01)

(56) References Cited

U.S. PATENT DOCUMENTS

| 7,325,398 | B2 | 2/2008 | Cherney |
| 8,726,645 | B2 | 5/2014 | Shang et al. |
| 9,593,467 | B2 | 3/2017 | Kajita et al. |
| 2005/0072144 | A1 | 4/2005 | Bitter et al. |
| 2005/0196288 | A1 | 9/2005 | Cherney |
| 2006/0108185 | A1 | 5/2006 | Bitter |
| 2007/0012038 | A1 | 1/2007 | Bitter |
| 2012/0151904 | A1 | 6/2012 | Shang |

FOREIGN PATENT DOCUMENTS

| CN | 201679802 | 12/2010 |
| CN | 202056123 | 11/2011 |
| EP | 0116024 | 8/1984 |
| EP | 1520994 | 4/2005 |
| EP | 2308795 | 4/2011 |
| EP | 2949951 | 12/2015 |
| WO | 2015117962 | 8/2015 |

SYSTEM FOR RECOVERING ENERGY FROM A HYDRAULIC ACTUATOR

BACKGROUND

The invention relates to a system for recovering energy from a hydraulic actuator and to a method of operating said system.

WO2015117962A1 relates to a series hydraulic hybrid system for a vehicle including a hydrostatic travel circuit, a hydraulic working assembly comprising a working pump and a hydraulic implement such as a hydraulic cylinder, and a hydraulic accumulator assembly. The hydraulic accumulator assembly is selectively fluidly connected with the hydraulic working assembly such that the hydraulic implement may be driven using the working pump or the hydraulic accumulator assembly.

Although WO2015117962A1 teaches that some of the vehicle energy may be recuperated and stored in the hydraulic accumulator assembly by way of regenerative braking, there is demand for a working machine with further improved energy efficiency.

SUMMARY

Based on the prior art it is an object of the present invention to design a working machine comprising a hydraulic implement, wherein the energy efficiency of the system is improved.

This object is solved by a system according to claim 1 and by a method of operating said system.

Thus, a system for recovering energy from a hydraulic actuator is presently proposed. The system comprises:
a hydraulic actuator;
a source of hydraulic pressure, preferably a hydraulic pump, in fluid communication with the hydraulic actuator for pressurizing the hydraulic actuator;
a hydraulic accumulator assembly for selectively absorbing energy from the hydraulic actuator or via the hydraulic actuator; and
a first one-way valve configured to provide fluid communication between the hydraulic actuator and the hydraulic accumulator assembly, the first one-way valve configured to permit a flow of fluid through the first one-way valve from the hydraulic actuator to the hydraulic accumulator assembly, and the first one-way valve configured to block a flow of fluid through the first one-way valve from the hydraulic accumulator assembly to the hydraulic actuator.

As the first one-way valve providing fluid communication between the hydraulic actuator and the hydraulic accumulator assembly is configured to permit a flow of fluid through the first one-way valve from the hydraulic actuator to the hydraulic accumulator assembly, the hydraulic accumulator assembly may absorb energy from the hydraulic actuator and store the absorbed energy for later use, thereby increasing the efficiency of the system.

For example, the hydraulic accumulator assembly may be selectively fluidly connected with a hydraulic unit such as a hydraulic pump, a hydraulic motor or a hydraulic implement, so that the energy absorbed from the hydraulic actuator and stored in the hydraulic accumulator assembly may be used to drive the hydraulic unit. In particular, the presently proposed system may comprise a hydrostatic transmission for a vehicle. Usually, the hydrostatic transmission comprises at least a hydraulic pump in fluid communication with a hydraulic motor. The hydrostatic transmission may further comprise a power source such as an internal combustion engine and/or an electric engine drivingly engaged or selectively drivingly engaged with the hydraulic pump of the hydrostatic transmission. And the hydrostatic transmission may further comprise a vehicle output drivingly engaged or selectively drivingly engaged with the hydraulic motor of the hydrostatic transmission. For example, the vehicle output may comprise at least one of a drive shaft, a vehicle axle, a differential, a final drive and a ground engaging structure such as one or more wheels. The hydraulic accumulator assembly may then be selectively fluidly connected to the hydrostatic transmission.

On the other hand, as the first one-way valve is configured to block a flow of fluid through the first one-way valve from the hydraulic accumulator assembly to the hydraulic actuator, a transfer of energy from the hydraulic accumulator assembly to the hydraulic actuator is prevented so that the energy stored in the hydraulic accumulator assembly may not interfere with the controlled movement of the hydraulic actuator.

The hydraulic actuator may comprise a linear actuator, for example a hydraulic cylinder and a piston that is movable within the cylinder by pressurizing the cylinder. Additionally or alternatively, the hydraulic actuator may comprise a rotational actuator such as a hydraulic motor. For example, the hydraulic actuator may be part of and may be configured to actuate at least one of: a telescopic boom, a lifting mechanism, a tilting mechanism, or a winching mechanism. In other words, the presently proposed system may comprise at least one of: a telescopic boom, a lifting mechanism, a tilting mechanism, or a winching mechanism. The hydraulic actuator may then be configured to actuate at least one of the telescopic boom, the lifting mechanism, the tilting mechanism, and the winching mechanism.

A fluid path comprising the first one-way valve and providing fluid communication between the hydraulic actuator and the hydraulic accumulator assembly may be the only fluid path providing fluid communication between the hydraulic actuator and the hydraulic accumulator assembly. In this way, an undesired transfer of energy from the hydraulic accumulator assembly to the hydraulic actuator via other fluid paths may be prevented.

The system may further comprise a first energy recovery control valve (ERCV) selectively fluidly connecting the hydraulic accumulator assembly with the hydraulic actuator. The first ERCV may have at least an open position and a closed position, the first ERCV in the open position permitting a flow of fluid between the hydraulic actuator and the hydraulic accumulator assembly through the first ERCV, and the first ERCV in the closed position fluidly isolating the hydraulic accumulator assembly from the hydraulic actuator.

The first ERCV may be configured as a pressure-actuatable valve. For example, the first ERCV may comprise a first pressure-actuatable actuator in fluid communication with the hydraulic actuator, wherein the first pressure-actuatable actuator of the first ERCV is configured to bias the first ERCV to the closed position. The first ERCV may further comprise a second pressure-actuatable actuator fluidly connected with or selectively fluidly connected with the hydraulic accumulator assembly, wherein the second pressure-actuatable actuator of the first ERCV is configured to bias the first ERCV to the open position. Thus, the first ERCV may be configured to be actuated based on a pressure in the hydraulic actuator and based on a pressure in the hydraulic accumulator assembly, in particular based on a pressure difference between the hydraulic actuator and the hydraulic accumulator assembly.

Specifically, the first pressure-actuatable actuator of the first ERCV may be fluidly connected with the hydraulic actuator for exerting a hydraulic pressure $p_{act}$ in the hydraulic actuator on the first pressure-actuatable actuator of the first ERCV for biasing the first ERCV to the closed position. And the second pressure-actuatable actuator of the first ERCV may be fluidly connected with or selectively fluidly connected with the hydraulic accumulator assembly for exerting a hydraulic pressure $p_{accu}$ in the hydraulic accumulator assembly on the second pressure-actuatable actuator of the first ERCV for biasing the first ERCV to the closed position.

For example, the second pressure-actuatable actuator of the first ERCV may be selectively fluidly connected with the hydraulic accumulator assembly via at least one second ERCV, wherein the second ERCV may be electrically controllable. By selectively fluidly connecting the second pressure actuatable actuator of the first ERCV with the hydraulic accumulator assembly and by selectively fluidly disconnecting the second pressure actuatable actuator of the first ERCV from the hydraulic accumulator assembly via the second ERCV, the first ERCV may be switched between the open and the closed position. Additionally or alternatively, the second ERCV may be configured to selectively fluidly connect the hydraulic accumulator assembly with a fluid port of the first ERCV. The second ERCV may be used to selectively enable and disable the transfer of energy from the hydraulic actuator to the hydraulic accumulator assembly.

The first ERCV may comprise a biasing member, preferably an adjustable biasing member and/or an electrically controllable biasing member. The biasing member of the first ERCV may be configured to bias the first ERCV to the open position. It is likewise conceivable that the first ERCV comprises a biasing member which is configured to bias the first ERCV to the closed position.

The first pressure-actuatable actuator of the first ERCV, the second pressure-actuatable actuator of the first ERCV and/or the biasing member of the first ERCV may be configured such that the first ERCV is switched or switches to the open position if a pressure difference $\Delta p = p_1 - p_2$ between a closing pressure $p_1$ acting on the first pressure-actuatable actuator of the first ERCV and biasing the first ERCV to the closed position and an opening pressure $p_2$ acting on the second pressure-actuatable actuator of the first ERCV and biasing the first ERCV to the open position is smaller than a predetermined pressure difference. For example, the predetermined pressure difference may be between 2 bar and 20 bar, or between 5 bar and 15 bar. The closing pressure $p_1$ may be a pressure in the hydraulic actuator or at a fluid port of the hydraulic actuator. The opening pressure $p_2$ may be a pressure in the hydraulic accumulator assembly. By adjusting the biasing member of the first ERCV, the value of the predetermined pressure difference may be varied and adapted to system requirements or applications requirements.

The system may further comprise an overcenter valve (OCV) for selectively draining fluid from the hydraulic actuator via the OCV. The OCV usually has at least an open position and a closed position. In the open position the OCV permits the draining of fluid from the hydraulic actuator via the OCV, and in the closed position the OCV blocks the draining of fluid from the hydraulic actuator via the OCV. The OCV typically comprises a biasing member biasing the OCV to the closed position. And the OCV typically further comprises a pressure-actuatable actuator configured to bias the OCV to the open position.

The hydraulic actuator usually comprises a first fluid port and a second fluid port. The pressure-actuatable actuator of the OCV may be fluidly connected with or selectively fluidly connected with the first fluid port of the hydraulic actuator, and the pressure-actuatable actuator of the OCV may be fluidly connected with or selectively fluidly connected with the second fluid port of the hydraulic actuator. Thus, the draining of fluid from the hydraulic actuator via the OCV may be controlled by controlling a pressure at the first fluid port and/or at the second fluid port of the hydraulic actuator, for example by means of the above-mentioned source of hydraulic pressure. Usually, the biasing member of the OCV has a high preload so that high pressures have to be exerted on the pressure-actuatable actuator of the OCV in order to switch the OCV to the open position to permit the draining of fluid from the hydraulic actuator via the OCV. In this way, the OCV may safely control a movement of the hydraulic actuator even when large forces act on the hydraulic actuator.

The system may further comprise a second one-way valve configured to provide fluid communication between a first fluid port of the OCV and a second fluid port of the OCV, the second one-way valve configured to permit a flow of fluid to bypass the OCV via the second one-way valve toward the hydraulic actuator, and the second one-way valve configured to block the draining of fluid from the hydraulic actuator via the second one-way valve. In other words, the second one way valve allows pressurizing the hydraulic actuator even when the OCV is switched to the closed position.

Preferably, the hydraulic accumulator assembly and the OCV are fluidly connected with or selectively fluidly connected with the same fluid port of the hydraulic actuator. For example, if the hydraulic actuator is part of a lifting mechanism for lifting a load, the hydraulic accumulator assembly and the OCV may be fluidly connected with or selectively fluidly connected with the fluid port of the hydraulic actuator which is pressurized due to the gravitational force of the load acting on the hydraulic actuator.

The proposed system may further comprise a hydraulically actuatable control mechanism configured to selectively apply a hydraulic pressure or an additional hydraulic pressure on the pressure-actuatable actuator of the overcenter valve, for example based at least on a hydraulic pressure in the hydraulic accumulator assembly. Preferably, the hydraulically actuatable control mechanism is configured to selectively apply a hydraulic pressure on the pressure-actuatable actuator of the overcenter valve based on a pressure difference between a hydraulic pressure in the hydraulic actuator, in particular a hydraulic pressure acting on the second fluid port of the hydraulic actuator, and a hydraulic pressure in the hydraulic accumulator assembly. In this way, the draining of fluid from the hydraulic actuator via the overcenter valve may be controlled or additionally controlled based on at least the hydraulic pressure in the hydraulic accumulator assembly.

The hydraulically actuatable control mechanism may comprises a pressure-actuatable control valve. The pressure-actuatable actuator of the overcenter valve may then be selectively fluidly connected with the hydraulic actuator, in particular with the first fluid port of the hydraulic actuator, and/or with the source of hydraulic pressure via the pressure-actuatable control valve. In some embodiments, the above-described first ERCV may comprise or may be configured as the pressure-actuatable control valve. In other embodiments, the first ERCV and the pressure-actuatable control valve may be configured as separate valves.

The pressure-actuatable control valve may comprise a first pressure-actuatable actuator fluidly connected with the hydraulic actuator, in particular fluidly connected with the second fluid port of the hydraulic actuator. The first pressure-actuatable actuator of the pressure-actuatable control valve may be configured to bias the pressure-actuatable control valve to a first position, wherein when the pressure-actuatable control valve is in the first position the pressure-actuatable actuator of the overcenter valve is fluidly connected with the hydraulic actuator, in particular with the first fluid port of the hydraulic actuator, via the pressure-actuatable control valve.

Additionally or alternatively, the pressure-actuatable control valve may comprise a second pressure-actuatable actuator fluidly connected with or selectively fluidly connected with the hydraulic accumulator assembly (the terms "first" and "second" pressure-actuatable actuator are merely used here to distinguish the two pressure-actuatable actuators of the pressure-actuatable control valve). The second pressure-actuatable actuator of the pressure-actuatable control valve may be configured to bias the pressure actuatable control valve to a second position, wherein when the pressure-actuatable control valve is in the second position the pressure-actuatable control valve interrupts a fluid connection between the pressure-actuatable actuator of the overcenter valve and the hydraulic actuator via the pressure-actuatable control valve.

Also, a method of operating the above-described system for absorbing energy from a hydraulic actuator is presently proposed, wherein the method comprises the steps:

if a hydraulic pressure difference $\Delta p = p_{act} - p_{accu}$ between a pressure $p_{act}$ in the hydraulic actuator and a pressure $p_{accu}$ in the hydraulic accumulator assembly is below a predetermined pressure difference, and if the hydraulic actuator is intended to be actuated, fluidly connecting the hydraulic accumulator assembly with the hydraulic actuator and displacing fluid from the hydraulic actuator to the hydraulic accumulator assembly so that the hydraulic accumulator assembly absorbs energy from the hydraulic actuator.

BRIEF DESCRIPTION OF THE DRAWINGS

Embodiment of the presently proposed system for recovering energy from a hydraulic actuator is described in the following detailed description and depicted in the accompanying drawing in which.

DETAILED DESCRIPTION

Figure 1A:
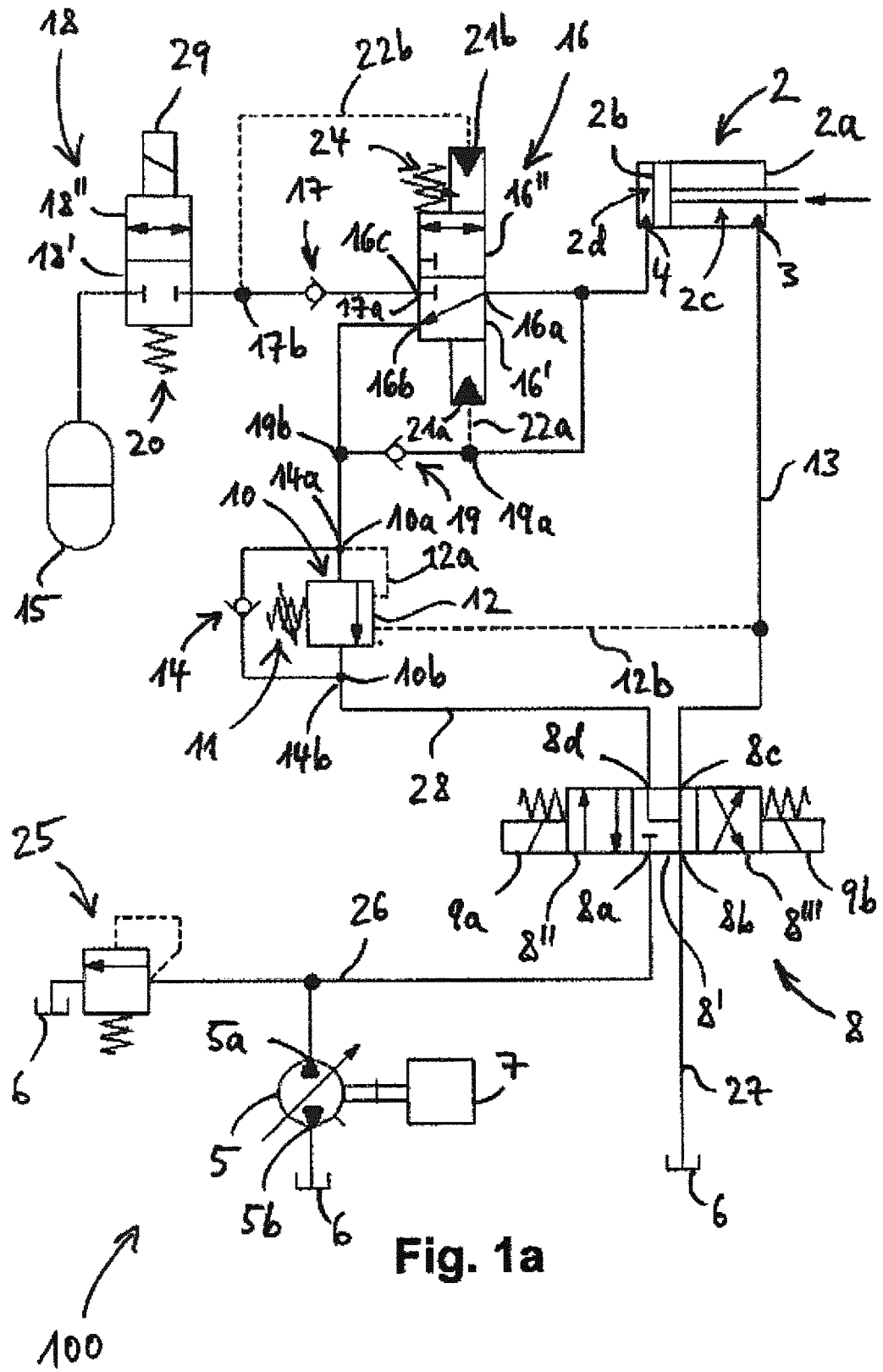
FIG. 1a shows a first embodiment of a system in accordance with the invention.

FIG. 1a shows an embodiment of a system 100 for recovering energy from a hydraulic actuator 2. Here, the hydraulic actuator 2 comprises a hydraulic cylinder 2a and a piston 2b which is movable within the hydraulic cylinder 2a. The piston 2b divides the hydraulic cylinder 2a in a first fluid compartment 2c and in a second fluid compartment 2d. The hydraulic actuator 2 comprises a first fluid port 3 and a second fluid port 4. The first fluid port 3 provides fluid communication with the first fluid compartment 2c, and the second fluid port 4 provides fluid communication with the second fluid compartment 2d. The hydraulic actuator 2 may be part of a hydraulic working assembly of a working machine such as an off-highway vehicle. Off-highway vehicles may include but are not limited to tractors, cranes, teleboom handlers, wheel loaders, backhoe loaders, or the like. In the embodiment of the system 100 shown in FIG. 1a the hydraulic actuator 2 is configured to actuate a lifting mechanism for lifting and for lowering a load. In particular, the system 100 of FIG. 1a including the hydraulic actuator 2 may be configured to lift and to lower loads having a weight of several tons or of tens of tons. In FIG. 1a, the lifting mechanism is lifted upwards by moving the piston 2b to the right, and the lifting mechanism is lowered by moving the piston 2b to the left.

In other embodiments of the system 100 not depicted here, the hydraulic actuator 2 may be configured to actuate a telescopic boom, a tilting mechanism, or the like. Also, it is conceivable that the hydraulic actuator 2 is configured as or comprises a hydraulic motor, for example for actuating a winching mechanism.

The system 100 further comprises a hydraulic pump 5 for pressurizing the hydraulic actuator 2 and for moving the piston 2b. Here, the hydraulic pump 5 has a variable hydraulic displacement and is in driving engagement with an engine 7 which is configured to drive the hydraulic pump 5. The engine 7 may include an internal combustion engine or an electric engine, for example. A first fluid port 5a of the hydraulic pump 5 is selectively fluidly connected with the hydraulic actuator 2 via a 4/3-way valve 8, and a second fluid port 5b of the hydraulic pump 5 is in fluid communication with a fluid tank 6. The fluid tank 6, too, is selectively fluidly connected with the hydraulic actuator 2 via the 4/3-way valve 8. The valve 8 may be an electrically actuatable valve comprising solenoids 9a, 9b. For example, the system 100 may comprise a control unit (not shown) in communication with the valve 8 for controlling the valve 8, in particular for controlling the solenoids 9a, 9b, for example by way of electromagnetic control signals. The first fluid port 5a of the hydraulic pump 5 is furthermore in fluid communication with the tank 6 by means of a pressure relief valve 25 for protecting the hydraulic pump 5 from hydraulic pressures exceeding a predetermined threshold pressure.

The system 100 further comprises an overcenter valve (or OCV) 10 having a first fluid port 10a and a second fluid port 10b. The OCV 10 may be selectively switched between an open position in which fluid is permitted to flow through the OCV 10, and a closed position (shown in FIG. 1a) in which a flow of fluid through the OCV 10 is blocked. The OCV 10 comprises a biasing member 11, typically a spring, biasing the OCV 10 to the closed position, and a pressure-actuatable actuator 12 configured to bias the OCV 10 to the open position. The pressure-actuatable actuator 12 of the OCV 10 is in fluid communication with the first fluid port 10a of the OCV 10 via a fluid line 12a, and with a pilot line 13 via a fluid line 12b. The pilot line 13 fluidly connects the valve 8 with the first fluid port 3 of the hydraulic actuator 2. Therefore, an opening force biasing the OCV 10 to the open position is controllable by means of a hydraulic pressure acting on the first fluid port 10a of the OCV 10, and by means of a hydraulic pressure in the pilot line 13 or at the first fluid port 3 of the hydraulic actuator 2.

When the OCV 10 is in the closed position, a draining of fluid from the hydraulic actuator 2, in particular from the second fluid compartment 2d of the hydraulic actuator 2 through the OCV 10 is blocked so that the piston 2b may be held at a desired position and/or at a desired height. Typically, the biasing member 11 biasing the OCV 10 to the closed position has a high preload. Thus, high hydraulic pressures acting on the pressure-actuatable actuator 12 of the OCV 10 are typically required to open the OCV 10. In this way, the OCV 10 is configured to hold the piston 2b of the hydraulic actuator 2 at a desired position and/or at a desired height even if a heavy load is placed on the lifting mechanism. For example, the OCV 10 may be configured to safely hold loads weighing several tons or several tens of tons.

A one-way valve 14 is arranged in parallel to the OCV 10. That is, a first fluid port 14a of the one-way valve 14 is fluidly connected with the first fluid port 10a of the OCV 10, and a second fluid port 14b of the one-way valve 14 is fluidly connected with the second fluid port 10b of the OCV 10. The one-way valve 14 is configured to permit a flow of fluid through the one-way valve 14 from the second fluid port 14b to the first fluid port 14a, and to block a flow of fluid through the one-way valve 14 from the first fluid port 14a to the second fluid port 14b. Thus, the one-way valve 14 is configured to block the draining of fluid, in particular the draining of fluid from the second fluid compartment 2d of the hydraulic actuator 2, through the one-way valve 14, and to permit fluid to bypass the OCV 10 through the one-way valve 14 in the direction from the second fluid port 14b to the first fluid port 14a, for example for pressurizing the hydraulic actuator 2, in particular for pressurizing the second fluid compartment 2d of the hydraulic actuator 2.

The system 100 further comprises a hydraulic accumulator assembly 15 for selectively absorbing energy from the hydraulic actuator 2 or via the hydraulic actuator 2, in particular from the piston 2b or via the piston 2b, and for storing the absorbed energy. The hydraulic accumulator assembly 15 may comprise a compressed gas hydro-pneumatic accumulator, for example a bladder accumulator. However, it is understood that the hydraulic accumulator assembly 15 may comprise other types of hydraulic accumulators. The hydraulic accumulator assembly 15 is selectively fluidly connected with the hydraulic actuator 2, in particular with the second fluid compartment 2d of the hydraulic actuator 2, via a first energy recovery control valve (or ERCV) 16, a one-way valve 17, and a second energy recovery control valve (or ERCV) 18.

Furthermore, the hydraulic accumulator assembly 15 may be selectively fluidly connected with the fluid tank 6 or with another fluid tank (not shown), for example for draining fluid stored in the hydraulic accumulator assembly 15 to the fluid tank 6. For example, the hydraulic accumulator assembly 15 may be in fluid communication with the fluid tank via a pressure relief valve, so that the pressure in the hydraulic accumulator assembly 15 does not exceed a predetermined threshold pressure. Additionally or alternatively, the hydraulic accumulator assembly 15 may be selectively fluidly connected with a hydraulic unit (not shown) for selectively driving the hydraulic unit and/or for selectively absorbing energy from the hydraulic unit. The hydraulic unit may include at least one of a further hydraulic pump, a hydraulic motor or a further hydraulic cylinder. In particular, the hydraulic accumulator assembly 15 may be selectively fluidly connected with a hydrostatic travel circuit of a hydraulic hybrid driveline of a vehicle or with a hydraulic working assembly including one or more hydraulic implements.

The first ERCV 16 is a 3/2-way valve having a first fluid port 16a, a second fluid port 16b, a third fluid port 16c, a first control position 16', and a second control position 16". The first fluid port 16a is fluidly connected with the second fluid port 4 of the hydraulic actuator 2. The second fluid port 16b is fluidly connected with the first fluid port 10a of the OCV 10 and with the first fluid port 14a of the one-way valve 14. And the third fluid port 16c is selectively fluidly connected with the hydraulic accumulator assembly 15 via the one-way valve 17 and via the second ERCV 18.

The first fluid port 16a and the second fluid port 16b of the first ERCV 16 are furthermore in fluid communication with one another via another one-way valve 19 having a first fluid port 19a and a second fluid port 19b. The one-way valve 19 is configured to permit a flow of fluid through the one-way valve 19 from the second fluid port 19b to the first fluid port 19a, and to block a flow of fluid through the one-way valve 19 from the first fluid port 19a to the second fluid port 19b. Thus, the one-way valve 19 is configured to block the draining of fluid from the hydraulic actuator 2 through the one-way valve 19, in particular from the second fluid compartment 2d of the hydraulic actuator 2, and to permit fluid to bypass the first ERCV 16 through the one-way valve 19 in the direction from the second fluid port 19b to the first fluid port 19a of the one-way valve 19, for example for pressurizing the hydraulic actuator 2.

When the first ERCV 16 is switched to the first control position 16' (as shown in FIG. 1a), the first fluid port 16a and the second fluid port 16b are fluidly connected with one another while the third fluid port 16c is fluidly isolated from the first fluid port 16a and from the second fluid port 16b. In other words, when the first ERCV 16 is switched to the first control position 16', the hydraulic actuator 2, in particular the second fluid port 4 of the hydraulic actuator 2, is fluidly connected with the OCV 10 via the first ERCV 16, and the hydraulic accumulator assembly 15 is fluidly isolated from the hydraulic actuator 2. That is, when the first ERCV 16 is switched to the first control position 16' and when the OCV 10 is in the open position, fluid may be drained from the hydraulic actuator 2 via the first ERCV 16 and via the OCV 10.

When the first ERCV 16 is switched to the second control position 16", the first fluid port 16a and the third fluid port 16c are fluidly connected with one another while the second fluid port 16b is fluidly isolated from the first fluid port 16a and from the third fluid port 16c. In other words, when the first ERCV 16 is switched to the second control position 16", the hydraulic actuator 2, in particular the second fluid port 4 of the hydraulic actuator 2, is selectively fluidly connected with the hydraulic accumulator assembly 15 via the one-way valve 17 and via the second ERCV 18. Also, when the first ERCV 16 is switched to the second control position 16", no fluid may be drained from the hydraulic actuator 2 via the first ERCV 16 and via the OCV 10.

The one-way valve 17 providing fluid communication between the hydraulic actuator and the hydraulic accumulator assembly 15 has a first fluid port 17a and a second fluid port 17b. The first fluid port 17a of the one-way valve 17 is fluidly connected with the third fluid port 16c of the first ERCV 16, and the second fluid port 17b of the one-way valve 17 is fluidly connected with the second ERCV 18. The one-way valve 17 is configured to permit a flow of fluid through the one-way valve 17 from the first fluid port 17a to the second fluid port 17b, and to block a flow of fluid through the one-way valve 17 from the second fluid port 17b to the first fluid port 17a. In other words, the one-way valve 17 is configured to permit a flow of fluid through the one-way valve 17 from the hydraulic actuator 2 toward the hydraulic accumulator assembly 15, and to block a flow of fluid through the one-way valve 17 from the hydraulic accumulator assembly 15 toward the hydraulic actuator 2. As the fluid path including the one-way valve 17 is the only fluid path providing fluid communication between the hydraulic actuator 2 and the hydraulic accumulator assembly 15, no energy may be transferred from the hydraulic accumulator assembly 15 to the hydraulic actuator 2. This may improve the controllability of the hydraulic actuator 2.

The second ERCV 18 is an electrically controllable 2/2-way shut-off valve having an open position 18' (shown in FIG. 1a) and a closed position 18". The second ERCV 18 may be actuated by way of a solenoid 29, for example through electromagnetic signals received from the above-mentioned control unit. When the second ERCV 18 is not actuated, it is biased to the closed position 18" by a biasing member 20.

Thus, when the first ERCV 16 is switched to the second control position 16" and the second ERCV 18 is switched to the open position 18", fluid may flow from the hydraulic actuator 2, in particular from the second fluid compartment 2d of the hydraulic actuator 2, to the hydraulic accumulator assembly 15 so that the hydraulic accumulator assembly 15 may absorb energy from or via the hydraulic actuator 2, in particular from or via the piston 2b.

The first ERCV 16 is configured as a pressure-actuatable valve. Specifically, the first ERCV 16 comprises a first pressure-actuatable actuator 21a configured to bias the first ERCV 16 to the first control position 16', and a second pressure-actuatable actuator 21b configured to bias the first ERCV 16 to the second control position 16".

The first pressure-actuatable actuator 21a is in fluid communication with the second fluid port 4 of the hydraulic actuator 2 via a fluid line 22a. Via the fluid line 22a, the first pressure-actuatable actuator 21a is further in fluid communication with the first fluid port 19a of the one-way valve 19. Thus, a hydraulic pressure acting on the first pressure-actuatable actuator 21a of the first ERCV 16 and biasing the first ERCV 16 to the first control position 16' is based on or given by a pressure in the second fluid compartment 2d of the hydraulic actuator 2. For example, the hydraulic pressure acting on the first pressure-actuatable actuator 21a of the first ERCV 16 and biasing the first ERCV 16 to the first control position 16' is based on a load placed on the lifting mechanism and forcing the piston 2b downward, i. e. to the left in FIG. 1a.

The second pressure-actuatable actuator 21b of the first ERCV 16 is in fluid communication with the second fluid port 17b of the one-way valve 17 via a fluid line 22b. That is, the second pressure-actuatable actuator 21b is selectively fluidly connected with the hydraulic accumulator assembly 15 via the second ERCV 18. Thus, when the second ERCV 18 is switched to the open position 18", a hydraulic pressure acting on the second pressure-actuatable actuator 21b of the first ERCV 16 and biasing the first ERCV 16 to the second control position 16" is based on or given by a pressure in the hydraulic accumulator assembly 15. The first ERCV 16 further comprises an adjustable biasing member 24 configured to bias the first ERCV 16 to the second control position 16".

The first pressure-actuatable actuator 21a, the second pressure-actuatable actuator 21b, and the biasing member 24 of the first ERCV 16 are configured such that the first ERCV 16 is switched to the second control position 16" if a pressure difference $\Delta p = p_a - p_b$ between a pressure $p_a$ acting on the first pressure-actuatable actuator 21a and biasing the first ERCV 16 to the first control position 16' and a pressure $p_b$ acting on the second pressure-actuatable actuator 21b and biasing the first ERCV 16 to the second control position 16" is smaller than a predetermined pressure difference $\Delta p_{th}$, i. e. if $\Delta p < \Delta p_{th}$.

In other words, the first ERCV 16 is configured to fluidly connect the hydraulic actuator 2 with the hydraulic accumulator assembly 15 only if a pressure difference $\Delta p = p_{act} - p_{accu}$ between a pressure $p_{act}$ in the hydraulic actuator 2, in particular in the second fluid compartment 2d of the hydraulic actuator 2, and a pressure $p_{accu}$ in the hydraulic accumulator assembly 15 is smaller than the predetermined pressure difference $\Delta p_{th}$.

In this way, a controlled braking of the hydraulic actuator 2 may be guaranteed, in particular a controlled braking of the piston 2b. By contrast, if the first ERCV 16 were configured to fluidly connect the hydraulic actuator 2 with the hydraulic accumulator assembly 15 when the pressure difference $\Delta p = p_{act} - p_{accu}$ between the pressure $p_{act}$ in the hydraulic actuator 2 and the pressure $p_{accu}$ in the hydraulic accumulator assembly is above the predetermined pressure difference $\Delta p_{th}$, an uncontrolled movement of the piston 2b could result. The value of the predetermined pressure difference $\Delta p_{th}$ may be chosen based on system parameters and/or system requirements. For example, the predetermined pressure difference may be chosen to between 2 bar and 20 bar, or between 5 bar and 15 bar. Preferably, the predetermined pressure difference $\Delta p_{th}$ may be chosen to have a value of about 10 bar.

The valve 8 providing selective fluid communication between the hydraulic pump 5 and the fluid tank 6 on one hand and the hydraulic actuator 2 on the other hand has a first fluid port 8a, a second fluid port 8b, a third fluid port 8c, and a fourth fluid port 8d. Furthermore, the valve 8 has a first (neutral) control position 8', a second control position 8", and a third control position 8'". The first fluid port 5a of the hydraulic pump 5 is fluidly connected with the first fluid port 8a of the valve 8 via a fluid line 26, and the fluid tank 6 is fluidly connected with the second fluid port 8b of the valve 8 via a fluid line 27. The third fluid port 8c of the valve 8 is fluidly connected with the first fluid port 3 of the hydraulic actuator 2 via the pilot line 13. And the fourth fluid port 8b of the valve is selectively fluidly connected with the second fluid port 10b of the OCV 10 and with the second fluid port 14b of the one-way valve 14 via a fluid line 28.

When the valve 8 is switched to its first (neutral) control position 8a, as shown in FIG. 1a, the valve 8 fluidly connects the fluid tank 6 with the first fluid port 3 of the hydraulic actuator 2 and selectively fluidly connects the second fluid port 4 of the hydraulic actuator 2 with the fluid tank 6 via the first ERCV 16 and the OCV 10. When the valve 8 is in the first (neutral) position 8', the hydraulic pump 5 is fluidly isolated from the hydraulic actuator 2.

When the valve 8 is switched to its second control position 8", the valve 8 provides fluid communication between the first fluid port 5a of the hydraulic 5 and the second fluid port 4 of the hydraulic actuator 2 via one-way valves 14, 19. Further, when the valve 8 is switched to its second control position 8", the valve 8 provides fluid communication between the first fluid port 3 of the hydraulic actuator 2 and the fluid tank 6. Therefore, when the valve 8 is switched to the second control position, the engine 7 may drive the hydraulic pump 5 to displace fluid from the fluid tank 6 to the hydraulic actuator 2, in particular to the second fluid compartment 2d of the hydraulic actuator 2, via the fluid lines 26, 28 and via the one-way valves 14, 19, thereby pressurizing the hydraulic actuator 2 and moving the piston 2b to the right in FIG. 1a for lifting the lifting mechanism upward. At the same time, fluid from the first fluid compartment 2c of the hydraulic actuator 2 is displaced to the fluid tank 6 via the pilot line 13 and the fluid line 27.

When the valve 8 is switched to its third control position 8''', the valve 8 fluidly connects the first fluid port 5a of the hydraulic pump 5 with the first fluid port 3 of the hydraulic actuator 2 via the fluid lines 26, 13, and fluidly connects the first fluid port 5a of the hydraulic pump 5 with the pressure-actuatable actuator 12 of the OCV 10 via the fluid lines 26, 13, 12b. Also, when the valve 8 is switched to its third control position 8''', the valve 8 selectively fluidly connects the second fluid port 4 of the hydraulic actuator 2 with the fluid tank 6 via the first ERCV 16 and the OCV 10.

For example, when the valve 8 is switched to its third control position 8''', the engine 7 may drive the hydraulic pump 5 to pressurize the first fluid compartment 2c of the hydraulic actuator 2 and to pressurize the pressure-actuatable actuator 12 of the OCV 10. If the second ERCV 18 is not actuated, the first pressure-actuatable actuator 21a of the first ERCV 16 will typically switch the first ERCV 16 to the first control position 16', thereby fluidly connecting the second fluid compartment 2d of the hydraulic actuator 2 with the first fluid port 10a and the pressure-actuatable actuator 12 of the OCV 10. Thus, if the pressure provided by the hydraulic pump 5 is high enough to overcome the closing force of the biasing member 11 of the OCV 10, the hydraulic pump 5 may displace fluid from the fluid tank 6 to the first fluid compartment 2c of the hydraulic actuator 2, and at the same time fluid from the second fluid compartment 2d of the hydraulic actuator 2 may be displaced to the fluid tank 6 via the first ERCV 16, the OCV 10 and the fluid lines 28, 27. That is, the piston 2b may move to the left in FIG. 1a, thereby lowering the lifting mechanism.

When the second ERCV 18 is switched to the second control position 18'', the second pressure-actuatable actuator 21b of the first ERCV 16 may force the first ERCV 16 to the second control position 16'', provided the pressure difference $\Delta p = p_{act} - p_{accu}$ between the pressure $p_{act}$ in the hydraulic actuator 2 and the pressure $p_{accu}$ in the hydraulic accumulator assembly 15 is smaller than the above-mentioned predetermined pressure difference $\Delta p_{th}$. In this situation, the piston 2b may move to the left in FIG. 1a to displace fluid from the second fluid compartment 2d of the hydraulic actuator 2 to the hydraulic accumulator assembly 15, or in other words, the hydraulic accumulator assembly 15 may absorb energy from the hydraulic actuator 2 or via the hydraulic actuator 2. For example, when both the first ERCV 16 and the second ERCV 18 are switched to their second control positions 16'', 18'', a load placed on the lifting mechanism may force the piston 2b to move to the left in FIG. 1a, thereby lowering the lifting mechanism, so that the hydraulic accumulator assembly 15 may absorb the potential energy or at least a portion of the potential energy of the load via the hydraulic actuator 2. In this situation, the valve 8 may be switched to its third control position 8''' and the hydraulic pump 5 may pressurize or additionally pressurize the first fluid compartment 2c of the hydraulic actuator 2 in order to avoid cavitation in the first fluid compartment 2c.

When the second ERCV 18 is switched to the second control position 18'' and the pressure in the hydraulic accumulator assembly 15 is not sufficient to switch the first ERCV 16 to the second control position 16'' via the second pressure-actuatable actuator 21b of the first ERCV 16, the first ERCV 16 automatically switches to the first control position 16', thereby fluidly connecting the hydraulic actuator 2 with the OCV 10. The valve 8 may then again be switched to the third control position 8''' and the engine 7 may drive the hydraulic pump 5 to pressurize the pressure-actuatable actuator 12 and the first fluid compartment 2c of the hydraulic actuator 2. As described above, the pressure provided by the hydraulic pump 5 may now open the OCV 10 and may lower the piston 2b (i. e. move the piston 2b to the left in FIG. 1a). That is, the hydraulic pump 5 may displace fluid from the fluid tank 6 to the first fluid compartment 2c of the hydraulic actuator 2 via the fluid lines 26, 13, the fluid from the second fluid compartment 2c may be displaced to the fluid tank 6 via the first ERCV 16, the open OCV 10 and the fluid lines 28, 27.

Figure 1B:
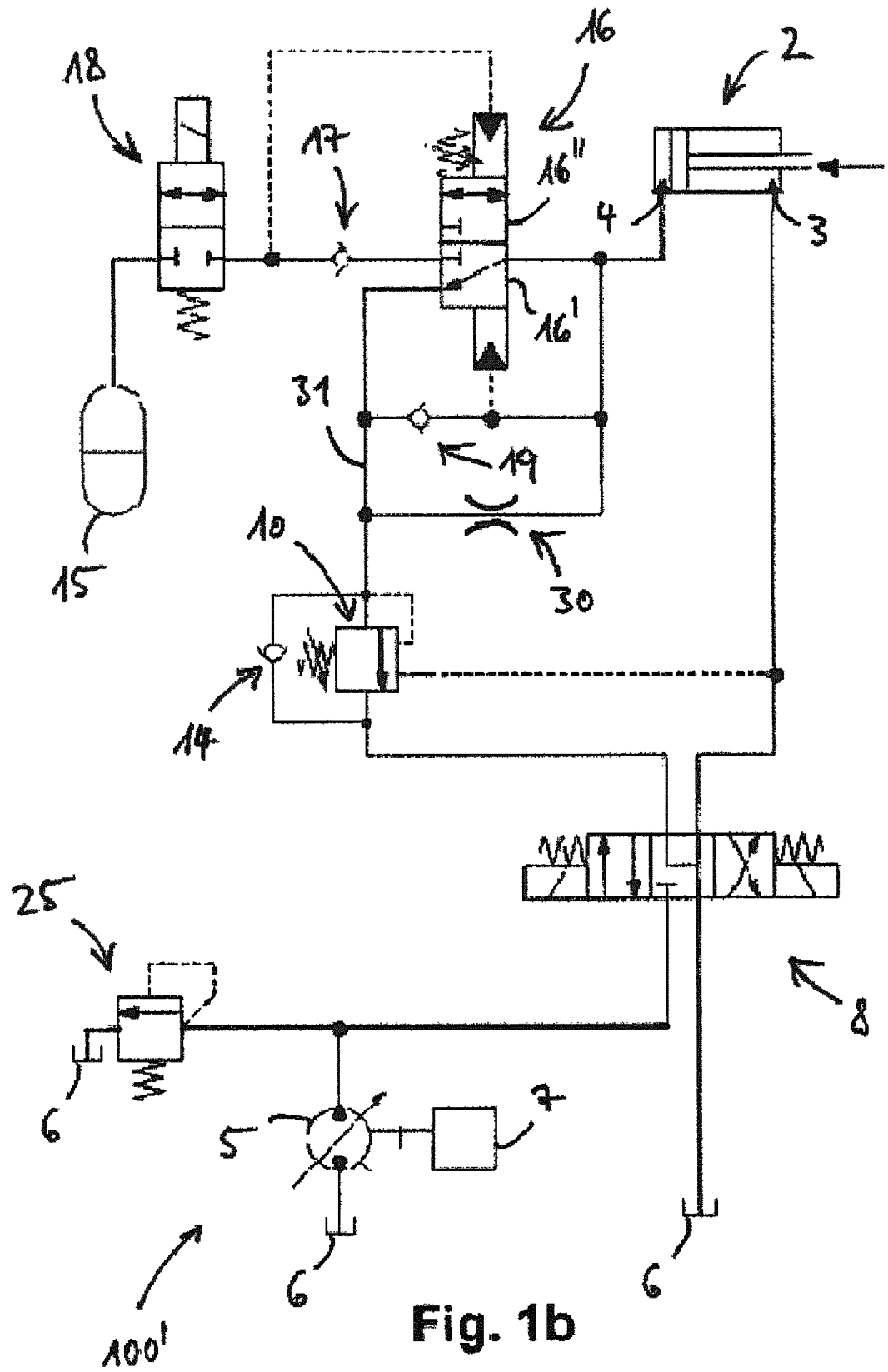
FIG. 1b shows a second embodiment of a system in accordance with the invention.

FIG. 1b shows another embodiment of a system 100' for recovering energy from a hydraulic actuator. The system 100' is a variation of the system 100 of FIG. 1a. Here and in the following recurring features are designated with the same reference signs. For simplicity, only the differences between the system 100' of Fig. ab and the system 100 of FIG. 1a are described in detail.

The system 100' of FIG. 1b differs from the system 100 of FIG. 1a in that the system 00' comprises an additional orifice 30 which fluidly connects the second fluid port 4 of the hydraulic actuator 2 with the first fluid port 10a of the OCV 10, so that the orifice 30 equalizes the pressures at the second fluid port 4 of the hydraulic actuator 2 and at the first fluid port 10a of the OCV 10. Thus, the orifice 30 may prevent the occurrence of sudden high pressure gradients between the second fluid port 4 of the hydraulic actuator 2 and the first fluid port 10a of the OCV 10, in particular when the first ERCV 16 is switched from the second control position 16'' to the first control position 16'. Such high pressure gradients between the second fluid port 4 of the hydraulic actuator 2 and the first fluid port 10a of the OCV 10 may cause undesirable jerks in the movement of the piston 2b. Thus, the orifice 30 may improve the controllability of the hydraulic actuator 2.

A cross section of the orifice 30 is typically smaller than a cross section of the fluid line 31 which fluidly connects the second fluid port 4 of the hydraulic actuator 2 with the first fluid port 10a of the OCV 10 when the first ERCV 16 is switched to the first control position 16'. Thus, the flow characteristics of the fluid line 31 are hardly affected by the orifice 30. The orifice 30 may be adjustable. That is, the orifice 30 may be configured such that its minimal cross section may be varied.

Figure 2A:
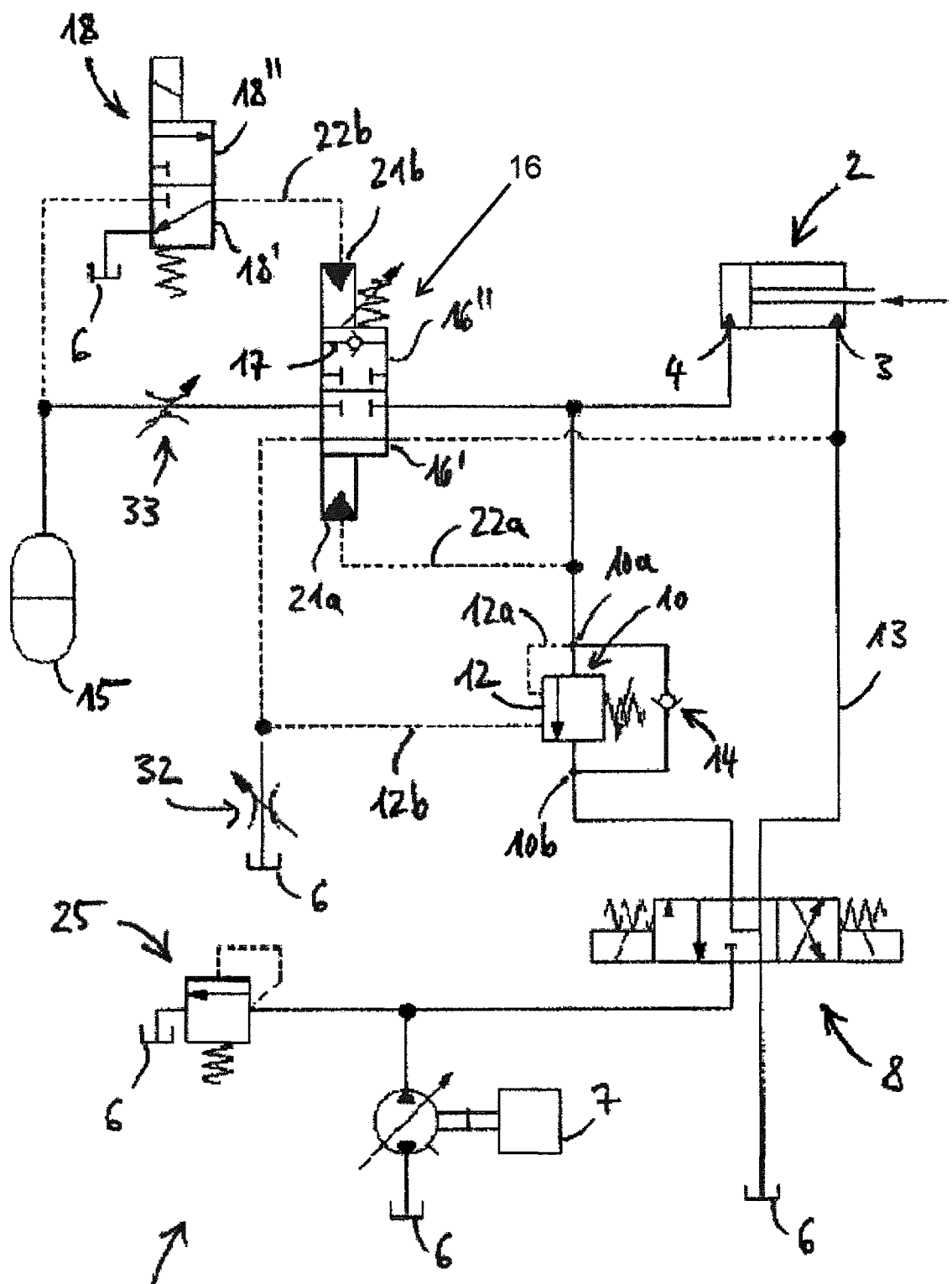
FIG. 2a shows a third embodiment of a system in accordance with the invention.

FIG. 2a shows another embodiment of a system 200 for recovering energy from a hydraulic actuator. The system 200 is another variation of the system 100 of FIG. 1a. In the following only the differences between the system 200 of FIG. 2a and the system 100 of FIG. 1a are described in detail.

The system 200 of FIG. 2a differs from the system 100 of FIG. 1a in that in the system 200 the second fluid port 4 of the hydraulic actuator 2 is permanently fluidly connected with the first fluid port 10a of the OCV 10. In other words, the one-way valve 19 of the system 100 of FIG. 1a is missing in the system 200 of FIG. 2a, so that the second fluid port 4 of the hydraulic actuator 2 and the first fluid port 10a of the OCV 10 are permanently at the same pressure level, irrespective of the control position of the first ERCV 16.

The system 200 of FIG. 2a further differs from the system 100 of FIG. 1a in that in the system 200 the pressure-actuatable actuator 12 of the OCV 10 is selectively fluidly connected with the pilot line 13, in particular via the first ERCV 16. Specifically, when the first ERCV 16 of the system 200 according to FIG. 2a is switched to the second control position 16", it fluidly isolates the pressure-actuatable actuator 12 of the OCV 10 from the pilot line 13 so that the OCV 10 functions as an regular pressure relief valve. Thus, when the first ERCV 16 according to the system 200 of FIG. 2a is switched to the second control position 16", a higher pressure in the hydraulic actuator 2 than in the system 100 of FIG. 1a is required to switch the OCV 10 to the open position. This allows using the system 200 of FIG. 2a for heavier loads and/or with higher load pressures. As in the system 100 of FIG. 1a, when switched to the first control position 16', the first ERCV 16 fluidly isolates the hydraulic accumulator assembly 15 from the hydraulic actuator 2.

The system 200 of FIG. 2a further differs from the system 100 of FIG. 1a in that in the system 200 the fluid line 12b providing fluid communication between the pressure-actuatable actuator 12 of the OVC 10 and the pilot line 13 is in fluid communication with the fluid tank 6 via an orifice 32. That is, when the first ERCV 16 of the system 200 is switched to the first control position 16', the pilot line 13 may be discharged to the fluid tank 6 via the orifice 32. The orifice 32 may be adjustable. That is, the orifice 32 may be configured such that its minimal cross section may be varied.

The system 200 of FIG. 2a further differs from the system 100 of FIG. 1a in that in the system 200 the hydraulic accumulator assembly 15 is permanently fluidly connected with the first ERCV 16 via an electronically adjustable orifice 33. The minimal cross section of the orifice 33 may be adjusted to reduce jerks of the piston 2b when switching the first ERCV 16 between the first control position 16' and the second control position 16".

The system 200 of FIG. 2a further differs from the system 100 of FIG. 1a in that in the system 200 the second ERCV 18 provides selective fluid communication only between the hydraulic accumulator assembly 15 and the second pressure-actuatable actuator 21b of the first ERCV 16. When switched to the first (neutral) control position 18', the second ERCV 18 provides fluid communication between the second pressure-actuatable actuator 21b of the first ERCV 16 and the fluid tank 6. Furthermore, the one-way valve 17 of the system 200 according to FIG. 2a is integrated in the first ERCV 16. When the first ERCV 16 of the system 200 is switched to the second control position 16", the one-way valve 17 permits a flow of fluid through the one-way valve 17 from the hydraulic actuator 2 to the hydraulic accumulator assembly 15, and blocks a flow of fluid from the hydraulic accumulator assembly 15 to the hydraulic actuator 2 through the one-way valve 17.

The system 200 according to FIG. 2a comprises a hydraulically actuatable control mechanism configured to selectively apply a hydraulic pressure or an additional hydraulic pressure on the pressure-actuatable actuator 12 of the OCV 10 based on a pressure difference between a hydraulic pressure acting on the second fluid port 4 of the hydraulic actuator 2 and a hydraulic pressure in the hydraulic accumulator assembly 15. Specifically, said hydraulically actuatable control mechanism comprises the first ERCV 16 including the pressure-actuatable actuators 21a, 21b of the first ERCV 16. The first ERCV 16 selectively fluidly connects the pressure-actuatable actuator 12 of the overcenter valve 10 with the first fluid port 3 of the hydraulic actuator 2 and/or with the fluid pump 5, depending on the control position of the valve 8.

The first pressure-actuatable actuator 21a of the first ERCV 16 is fluidly connected with the second fluid port 4 of the hydraulic actuator 2 and is configured to bias the first ERCV 16 to the first control position 16'. When the first ERCV 16 is switched to the first control position 16', the pressure-actuatable actuator 12 of the OCV 10 is fluidly connected with the first fluid port 3 of the hydraulic actuator 2 via the first ERCV 16.

The second pressure-actuatable actuator 21b of the first ERCV 16 is selectively fluidly connected with the hydraulic accumulator assembly 15, for example via the second ERCV 18. The second pressure-actuatable actuator 21b of the first ERCV 16 is configured to bias the first ERCV 16 to the second control position 16". When the first ERCV 16 is switched to the second control position 16", the first ERCV 16 interrupts the fluid connection between the pressure-actuatable actuator 12 of the OCV 10 and the first fluid port 3 of hydraulic actuator 2.

Figure 2B:
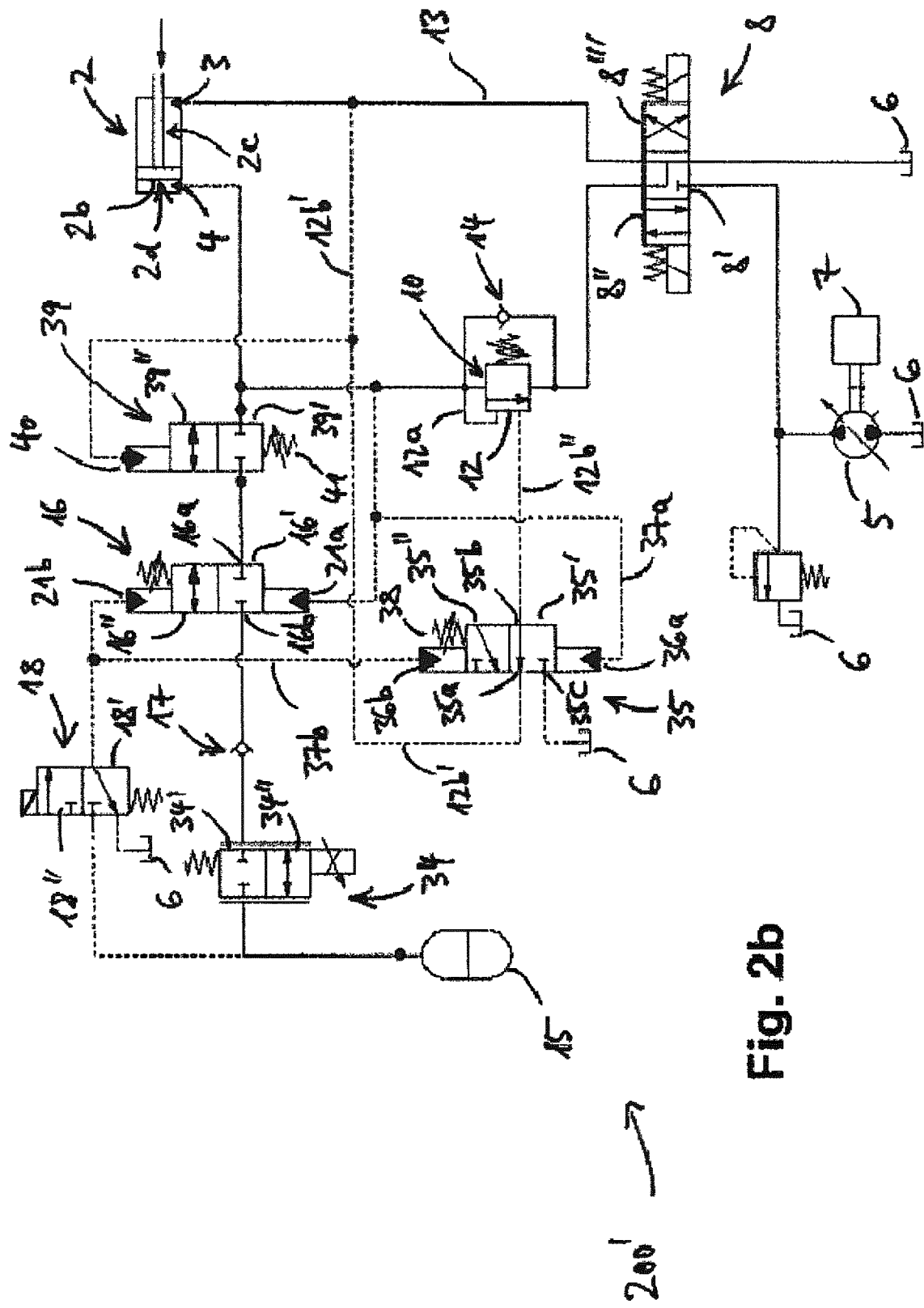
FIG. 2b shows a fourth embodiment of a system in accordance with the invention.

FIG. 2b shows another embodiment of a system 200' for recovering energy from a hydraulic actuator. The system 200' is a variation of the system 200 of FIG. 2a. In the following only the differences between the system 200' of FIG. 2b and the system 200 of FIG. 2a are described in detail.

In the system 200' of FIG. 2b the adjustable orifice 33 of the system 200 according to FIG. 2a is replaced by an electrically controllable proportional control valve 34. Also, in contrast to the system 200 of FIG. 2a, the first ERCV 16 and the one-way valve 17 are configured as separate components. The first ERCV 16 is configured as a 2/2-way valve having two fluid ports 16a, 16b and two control positions 16', 16". When switched to the first control position 16', the first ERCV 16 fluidly isolates the hydraulic accumulator assembly 15 from the hydraulic actuator 2. And when switched to the second control position 16", the first ERCV 16 permits fluid to pass through the first ERCV 16.

The system 200' of FIG. 2b further differs from the system 200 of FIG. 2a in that selective fluid communication between the pressure-actuatable actuator 12 of the OCV 10 and the pilot line 13 is provided by an additional pressure-actuatable valve 35 rather than by the first ERCV 16. The valve 35 is configured as a 3/2-way valve having three fluid ports 35a, 35b, 35c and two control positions 35', 35". The first fluid port 35a is fluidly connected with the pilot line 13 via a fluid line 12b', and the second fluid port 35b is fluidly connected with the pressure-actuatable actuator 12 of the OVC 10 via a fluid line 12b". The third fluid port 35c is in fluid communication with the fluid tank 6.

When switched to the first control position 35', the valve 35 fluidly connects the pressure-actuatable actuator 12 of the OVC 10 with the pilot line 13 and fluidly isolates the fluid ports 35a, 35b from the third fluid port 35c and from the fluid tank 6. When switched to the second control position 35", the valve 35 provides fluid communication between the pressure-actuatable actuator 12 of the OVC 10 and the fluid tank 6, and fluidly isolates the pressure-actuatable actuator 12 of the OVC 10 and the fluid tank 6 from the pilot line 13 so that the OCV 10 functions as a regular pressure relief valve.

The valve 35 comprises a first pressure-actuatable actuator 36a in fluid communication with the first pressure-actuatable actuator 21a of the first ERCV 16 via a fluid line 37a, and a second pressure-actuatable actuator 36b in fluid communication with the second pressure-actuatable actuator 21*b* of the first ERCV 16 via a fluid line 37*b*. The first pressure-actuatable actuator 36*a* of the valve 35 is configured to bias the valve 35 to the first control position 35', and the second pressure-actuatable actuator 36*b* of the valve 35 is configured to bias the valve 35 to the second control position 35". The valve 35 further comprises an adjustable biasing member 38 configured to additionally bias the valve 35 to the second control position 35".

The valve 35 of the system 200' of FIG. 2*b* may be configured to provide selective fluid communication between the pressure-actuatable actuator 12 of the OCV and the pilot line 13 in a manner similar to the first ERCV 16 of the system 200 of FIG. 2*a*. That is, the first ERCV 16 and the valve 35 of the system 200' of FIG. 2*b* may be configured such that they are simultaneously switched to their first control position 16', 35", respectively, and that they are simultaneously switched to the second control position 16", 35", respectively.

The system 200' of FIG. 2*b* further differs from the system 200 of FIG. 2*a* in that the system 200' comprises a further 2/2-way shut-off valve 39 selectively fluidly connecting the hydraulic actuator 2 with the first ERCV 16. When switched to a first (closed) position 39', the valve 39 fluidly isolates the hydraulic actuator 2 from the first ERCV 16 and from the hydraulic accumulator assembly 15. When switched to a second (open) control position 39", the valve 39 fluidly connects the hydraulic actuator 2 with the first ERCV 16. The valve 39 comprises a pressure-actuatable actuator 40 in fluid communication with the pilot line 13 and configured to bias the valve 39 to the second (open) control position 39", and an adjustable biasing member 41 configured to bias the valve 39 to the first (closed) control position 39'.

The shut-off valve 39 is configured such that it automatically switches to the first (closed) control position 39' in case of a leakage in the fluid line connecting the hydraulic actuator 2 with the hydraulic accumulator assembly 15. Such undesired leakage causes the piston 2*b* to move to the left in FIG. 2*b* which in turn results in a pressure drop in the first fluid compartment 2*c* of the hydraulic actuator 2. If the pressure in the first fluid compartment 2*c* of the hydraulic actuator drops below a predetermined threshold pressure, the valve 39 automatically switches to the first (closed) control position 39', thereby preventing further leakage from the hydraulic actuator 2.

The system 200' according to FIG. 2*b* comprises a hydraulically actuatable control mechanism configured to selectively apply a hydraulic pressure or an additional hydraulic pressure on the pressure-actuatable actuator 12 of the OCV 10 based on a pressure difference between a hydraulic pressure acting on the second fluid port 4 of the hydraulic actuator 2 and a hydraulic pressure in the hydraulic accumulator assembly 15. Specifically, said hydraulically actuatable control mechanism comprises the pressure-actuatable control valve 35 including the pressure-actuatable actuators 36*a*, 36*b*. The pressure-actuatable control valve 35 selectively fluidly connects the pressure-actuatable actuator 12 of the OCV 10 with the first fluid port 3 of the hydraulic actuator 2 and/or with the fluid pump 5, depending on the control position of the valve 8.

The first pressure-actuatable actuator 36*a* of the pressure-actuatable control valve 35 is fluidly connected with the second fluid port 4 of the hydraulic actuator 2 and is configured to bias the pressure-actuatable control valve 35 to the first control position 35'. When the pressure-actuatable control valve 35 is switched to the first control position 35', the pressure-actuatable actuator 12 of the OCV 10 is fluidly connected with the first fluid port 3 of the hydraulic actuator 2 via the pressure-actuatable control valve 35.

The second pressure-actuatable actuator 36*b* of the pressure-actuatable control valve 35 is selectively fluidly connected with the hydraulic accumulator assembly 15, for example via the second ERCV 18. The second pressure-actuatable actuator 36*b* of the pressure-actuatable control valve 35 is configured to bias the pressure-actuatable control valve 35 to the second control position 35". When the pressure-actuatable control valve 35 is switched to the second control position 35", the pressure-actuatable control valve 35 interrupts the fluid connection between the pressure-actuatable actuator 12 of the OCV 10 and the first fluid port 3 of hydraulic actuator 2.

Figure 3A:
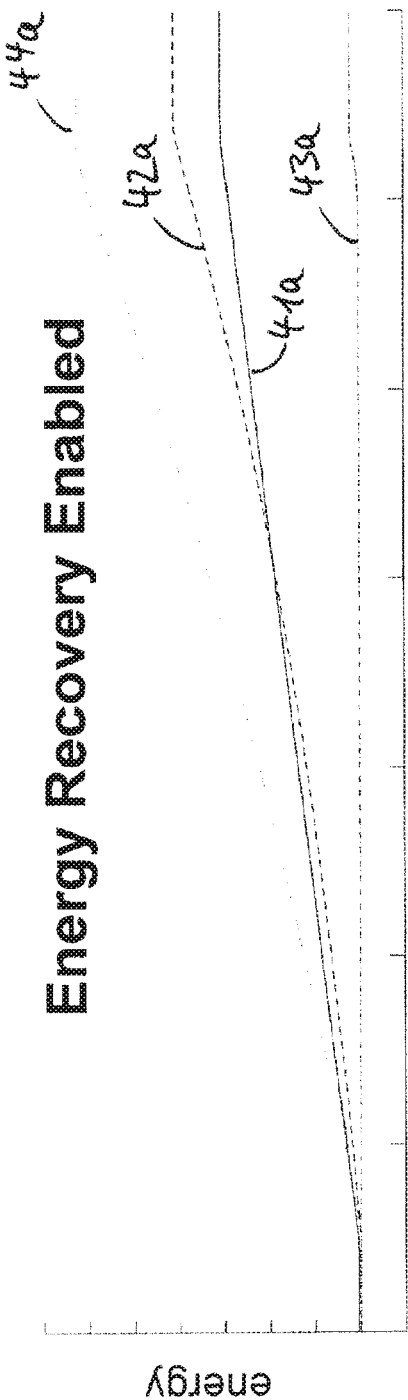
FIGS. 3a, 3b show an energy balance related to a process of lowering a hydraulically actuated piston of the system of FIG. 2b, wherein a portion of the energy injected into the system is recuperated and stored in a hydraulic accumulator assembly.
Figure 3B:
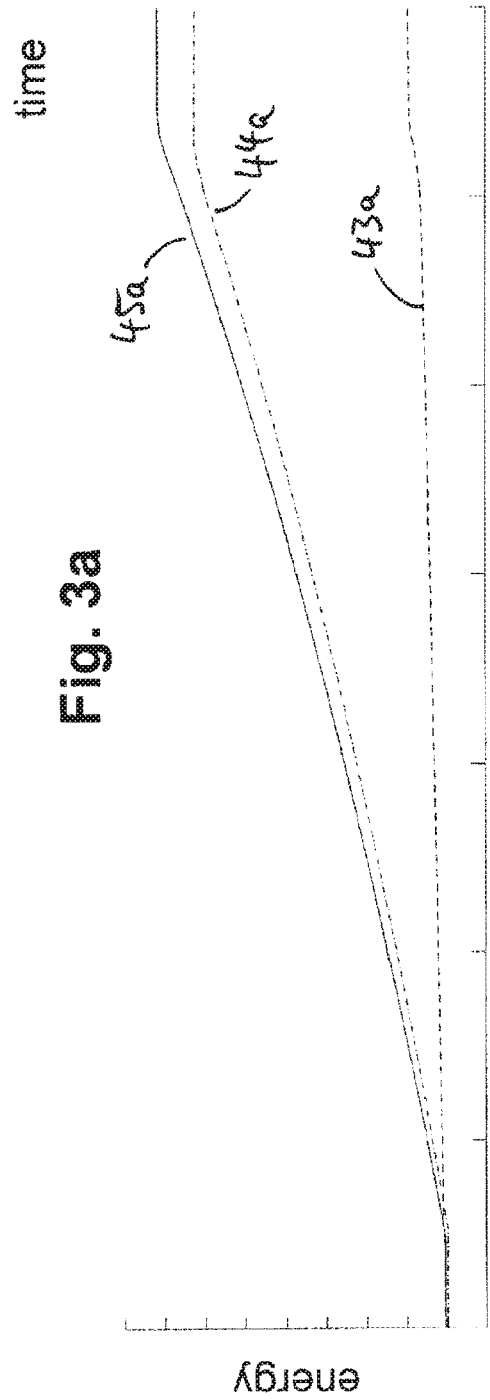

FIGS. 3*a* and 3*b* illustrate an energy balance related to the process of lowering the piston 2*b* using the system 200' of FIG. 2*b*. During the lowering of the piston 2*b* depicted in FIGS. 3*a* and 3*b*, energy recovery is enabled. That is, the valves 39, 16 and 34 are switched to their open state 39", 16", 34", respectively, thereby permitting fluid from the second fluid compartment 2*d* of the hydraulic actuator 2 to be displaced to the hydraulic accumulator 15 as the piston 2*b* is lowered (i. e. as the piston 2*b* is moved to the left in FIG. 2*b*). During the process depicted in FIGS. 3*a* and 3*b*, the valve 8 is switched to the third control position 8'" and the engine 7 drives the hydraulic pump 5 to displace fluid from the fluid tank 6 to the first fluid compartment 2*c* of the hydraulic actuator 2 for lowering the piston 2*b*. Furthermore, during the process depicted in FIGS. 3*a* and 3*b*, the valve 35 is in the second control position 35", thereby fluidly disconnecting the pressure-actuatable actuator 12 of the OCV 10 from the pilot line 13. That is, as the piston 2*b* is lowered, the OCV 10 functions as a pressure relief value configured to protect the system 200' from high pressures. For example, as the pressure-actuatable actuator 12 of the OCV 10 is fluidly disconnected from the pilot line 13, the OCV 10 may switch to the open position if the pressure at the second fluid port 4 of the hydraulic actuator 2 exceeds a threshold pressure, wherein the threshold pressure may be at least 250 bar or at least 300 bar.

Specifically, FIG. 3*a* shows a time course of the mechanical energy 41*a* released by the load via the hydraulic actuator 2 (due to the loss of potential energy of the load), the work 42*a* expended by the engine 7 for driving the hydraulic pump 5, the energy 43*a* dissipated in the system 200', and the energy 44*a* transferred to the hydraulic accumulator assembly 15 and stored in the hydraulic accumulator assembly 15. The dissipated energy 43*a* may include energy dissipated due to friction between the piston 2*b* and the cylinder 2*a* or energy dissipated via the lifting mechanism, for example.

FIG. 3*b* depicts the total amount of energy 45*a* injected into the system (that is, the sum of the mechanical energy 41*a* released by the load and the work 42*a* expended by the engine 7), the dissipated energy 43*a*, and the energy 44*a* stored in the hydraulic accumulator assembly 15. It can be observed that the stored energy 44*a* closely follows the total amount of energy 45*a* injected into the system. Specifically, with the energy recovery mode of the system 200' of FIG. 2*b* enabled, approximately 87 percent of the total amount of energy 45*a* injected into the system is recuperated and stored in the hydraulic accumulator assembly 15. This reflects the high degree of energy efficiency of the system 200' of FIG. 2*b*.

Figure 4A:
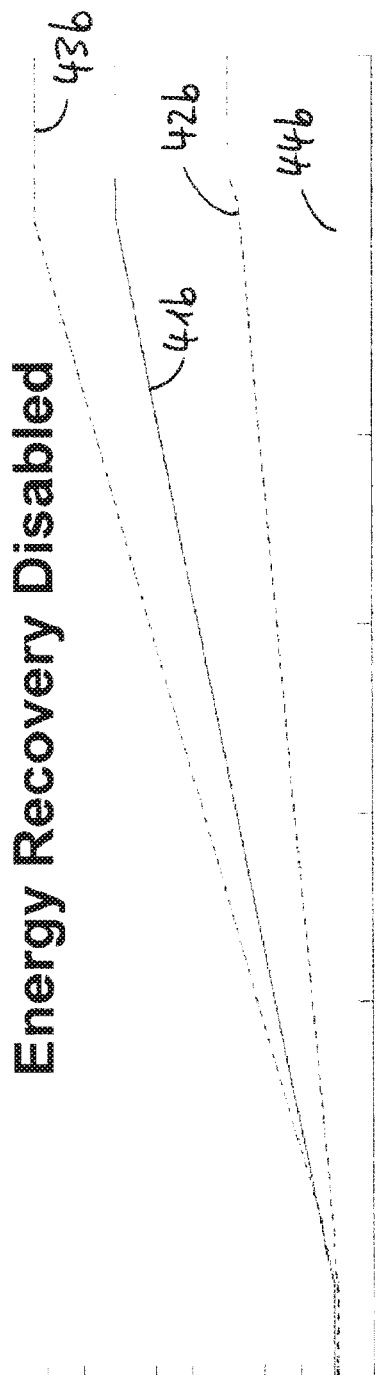
FIGS. 4a, 4b show an energy balance related to a process of lowering the hydraulically actuated piston of the system of FIG. 2b, wherein the hydraulic accumulator assembly is fluidly isolated from the piston so that none of the energy injected into the system is stored in the hydraulic accumulator assembly.
Figure 4B:
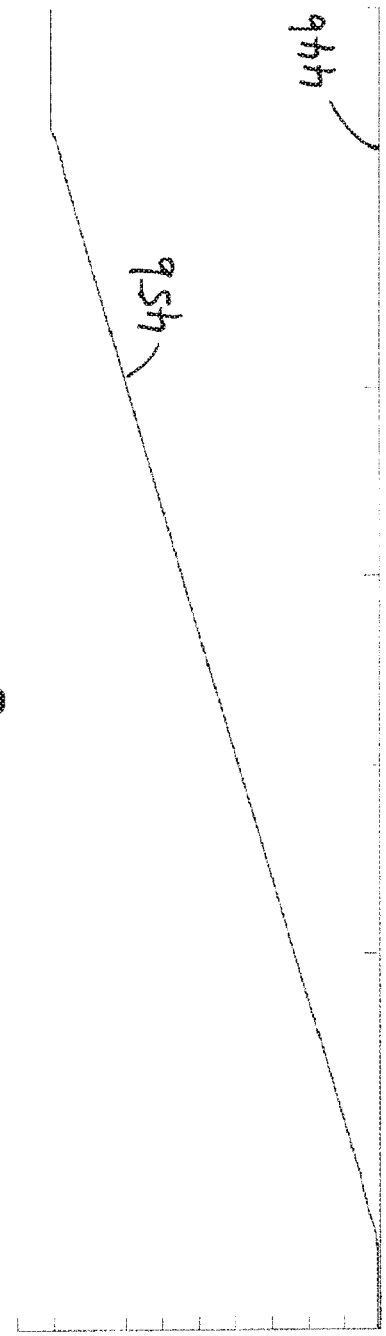

By contrast, FIGS. 4*a* and 4*b* illustrate the corresponding energy balance related to the process of lowering the piston 2*b* using the system 200' of FIG. 2*b* with the energy recovery mode disabled. That is, the first ERCV 16 is switched to the closed state 16', thereby fluidly isolating the hydraulic accumulator assembly 15 from the hydraulic actuator 2 and fluidly connecting the second fluid compartment 2*d* of the hydraulic actuator 2 with the pressure-actuatable actuator 12 of the OCV 10. Again, during the process depicted in FIGS. 4*a* and 4*b*, the valve 8 is switched to the third control position 8''' and the engine 7 drives the hydraulic pump 5 to displace fluid from the fluid tank 6 to the first fluid compartment 2*c* of the hydraulic actuator 2 for lowering the piston 2*b*. Furthermore, during the process depicted in FIGS. 4*a* and 4*b*, the pressure acting on the pressure-actuatable actuator 12 of the OCV 10 exceeds the preload of the biasing member 11 of the OCV 10, thereby switching the OCV 3.0 to the open state and permitting the draining of fluid from the hydraulic actuator 2 to the fluid tank 6 via the OCV 10.

Specifically, FIG. 4*a* shows a time course of the mechanical energy 41*b* released by the load via the hydraulic actuator 2 (due to the loss of potential energy of the load), the work 42*b* expended by the engine 7 for driving the hydraulic pump 5, the energy 43*b* dissipated via the OCV 3.0 (in particular during the process of opening the OCV 10 against the closing force of the biasing member 11 of the OCV 3.0), and the (zero) energy 44*b* stored in the hydraulic accumulator assembly 15.

Again, FIG. 4*b* depicts the total amount of energy 45*b* injected into the system (that is, the sum of the mechanical energy 41*b* released by the load and the work 42*b* expended by the engine 7), and the (zero) energy 44*b* stored in the hydraulic accumulator assembly 15. Obviously, with the energy recovery mode of the system 200' disabled, none of the total amount of energy 45*a* injected into the system 200' is recuperated.

The invention claimed is:

1. A system for recovering energy from a hydraulic actuator, the system comprising:
   the hydraulic actuator;
   a source of hydraulic pressure in fluid communication with the hydraulic actuator for pressurizing the hydraulic actuator;
   a hydraulic accumulator assembly for selectively absorbing energy from the hydraulic actuator;
   a first one-way valve configured to provide fluid communication between the hydraulic actuator and the hydraulic accumulator assembly, the first one-way valve configured to permit a flow of fluid through the first one-way valve from the hydraulic actuator to the hydraulic accumulator assembly, and the first one-way valve configured to block a flow of fluid through the first one-way valve from the hydraulic accumulator assembly to the hydraulic actuator;
   an overcenter valve for selectively draining fluid from the hydraulic actuator via the overcenter valve, the overcenter valve having an open position and a closed position, the overcenter valve in the open position permitting the draining of fluid from the hydraulic actuator via the overcenter valve, and the overcenter valve in the closed position blocking the draining of fluid from the hydraulic actuator via the overcenter valve, the overcenter valve comprising a biasing member biasing the overcenter valve to the closed position, and the overcenter valve having a pressure-actuatable actuator configured to bias the overcenter valve to the open position; and
   a pressure-actuatable control valve configured to selectively apply, based at least on a hydraulic pressure in the hydraulic accumulator assembly, a hydraulic pressure on the pressure-actuatable actuator of the overcenter valve.

2. The system according to claim 1, wherein the pressure-actuatable actuator of the overcenter valve is selectively fluidly connected with at least one of the hydraulic actuator and the source of hydraulic pressure via the pressure-actuatable control valve.

3. The system according to claim 2, wherein the pressure-actuatable control valve comprises a first pressure-actuatable actuator fluidly connected with the hydraulic actuator and configured to bias the pressure-actuatable control valve to a first position, wherein when the pressure-actuatable control valve is in the first position the pressure-actuatable actuator of the overcenter valve is fluidly connected with the hydraulic actuator via the pressure-actuatable control valve.

4. The system according to claim 2, wherein the pressure-actuatable control valve comprises a second pressure-actuatable actuator selectively fluidly connected with the hydraulic accumulator assembly and configured to bias the pressure actuatable control valve to a second position, wherein when the pressure-actuatable control valve is in the second position the pressure-actuatable control valve interrupts a fluid connection between the pressure-actuatable actuator of the overcenter valve and the hydraulic actuator via the pressure-actuatable control valve.

5. The system according to claim 1, further comprising at least one of:
   a telescopic boom, a lifting mechanism, a tilting mechanism, or a winching mechanism, wherein the hydraulic actuator is configured to actuate the telescopic boom, the lifting mechanism, the tilting mechanism, or the winching mechanism.

6. The system according to claim 1, wherein the hydraulic actuator comprises a first fluid port and a second fluid port, wherein a first port of the pressure-actuatable actuator of the overcenter valve is fluidly connected with or selectively fluidly connected with the first fluid port of the hydraulic actuator, and wherein a second port of the pressure-actuatable actuator of the overcenter valve is fluidly connected with or selectively fluidly connected with the second fluid port of the hydraulic actuator.

7. The system according to claim 1, comprising a second one-way valve configured to provide fluid communication between a first fluid port of the overcenter valve and a second fluid port of the overcenter valve, the second one-way valve configured to permit a flow of fluid to bypass the overcenter valve via the second one-way valve toward the hydraulic actuator, and the second one-way valve configured to block the draining of fluid from the hydraulic actuator via the second one-way valve.

8. The system according to claim 1, wherein the hydraulic actuator comprises a first fluid port and a second fluid port, and wherein the hydraulic accumulator assembly and the overcenter valve are fluidly connected with or selectively fluidly connected with the same fluid port of the hydraulic actuator.

9. The system according to claim 1, wherein the source of hydraulic pressure includes a hydraulic pump.

10. The system according to claim 1, wherein the hydraulic actuator comprises at least one of a hydraulic cylinder and a hydraulic motor.

11. A system for recovering energy from a hydraulic actuator, the system comprising:
the hydraulic actuator;
a source of hydraulic pressure in fluid communication with the hydraulic actuator for pressurizing the hydraulic actuator;
a hydraulic accumulator assembly for selectively absorbing energy from the hydraulic actuator or via the hydraulic actuator;
a first one-way valve configured to provide fluid communication between the hydraulic actuator and the hydraulic accumulator assembly, the first one-way valve configured to permit a flow of fluid through the first one-way valve from the hydraulic actuator to the hydraulic accumulator assembly, and the first one-way valve configured to block a flow of fluid through the first one-way valve from the hydraulic accumulator assembly to the hydraulic actuator; and
an overcenter valve for selectively draining fluid from the hydraulic actuator via the overcenter valve, the overcenter valve having an open position and a closed position, the overcenter valve in the open position permitting the draining of fluid from the hydraulic actuator via the overcenter valve, and the overcenter valve in the closed position blocking the draining of fluid from the hydraulic actuator via the overcenter valve, the overcenter valve comprising a biasing member biasing the overcenter valve to the closed position, and the overcenter valve having a pressure-actuatable actuator configured to bias the overcenter valve to the open position
a first energy recovery control valve selectively fluidly connecting the hydraulic accumulator assembly with the hydraulic actuator, the first energy recovery control valve having an open position and a closed position, the first energy recovery control valve in the open position permitting a flow of fluid from the hydraulic actuator to the hydraulic accumulator assembly through the first energy recovery control valve, and the first energy recovery control valve in the closed position fluidly isolating the hydraulic accumulator assembly from the hydraulic actuator, the first energy recovery control valve comprising a first pressure-actuatable actuator in fluid communication with the hydraulic actuator and configured to bias the first energy recovery control valve to the closed position, and the first energy recovery control valve comprising a second pressure-actuatable actuator fluidly connected with or selectively fluidly connected with the hydraulic accumulator assembly and configured to bias the first energy recovery control valve to the open position.

12. The system according to claim 11, wherein the first energy recovery control valve comprises a biasing member, the biasing member of the first energy recovery control valve configured to bias the first energy recovery control valve to the open position.

13. The system according to claim 11, wherein the first pressure-actuatable actuator of the first energy recovery control valve, and at least one of the second pressure-actuatable actuator of the first energy recovery control valve and a biasing member of the first energy recovery control valve are configured such that the first energy recovery control valve is switched to the open position if a pressure difference $\Delta p=p_1-p_2$ between a closing pressure $p_1$ acting on the first pressure-actuatable actuator and biasing the first energy recovery control valve to the closed position and an opening pressure $p_2$ acting on the second pressure-actuatable actuator and biasing the first energy recovery control valve to the open position is smaller than a predetermined pressure difference, wherein the predetermined pressure difference is between 2 bar and 20 bar.

14. The system according to any one of claim 11, further comprising a second energy recovery control valve configured to selectively fluidly connect the hydraulic accumulator assembly with at least one of a fluid port of the first energy recovery control valve and the second pressure-actuatable actuator of the first energy recovery control valve.

15. A method of operating a system for recovering energy from a hydraulic actuator, comprising the steps:
providing a system for recovering energy from a hydraulic actuator, the system comprising:
a hydraulic actuator,
a source of hydraulic pressure in fluid communication with the hydraulic actuator for pressurizing the hydraulic actuator,
a hydraulic accumulator assembly for selectively absorbing energy from the hydraulic actuator or via the hydraulic actuator,
a first one-way valve configured to provide fluid communication between the hydraulic actuator and the hydraulic accumulator assembly, the first one-way valve configured to permit a flow of fluid through the first one-way valve from the hydraulic actuator to the hydraulic accumulator assembly, and the first one-way valve configured to block a flow of fluid through the first one-way valve from the hydraulic accumulator assembly to the hydraulic actuator, and
an overcenter valve for selectively draining fluid from the hydraulic actuator via the overcenter valve, the overcenter valve having an open position and a closed position, the overcenter valve in the open position permitting the draining of fluid from the hydraulic actuator via the overcenter valve, and the overcenter valve in the closed position blocking the draining of fluid from the hydraulic actuator via the overcenter valve, the overcenter valve comprising a biasing member biasing the overcenter valve to the closed position, and the overcenter valve having a pressure-actuatable actuator configured to bias the overcenter valve to the open position;
if a pressure difference $\Delta p=p_{act}-p_{accu}$ between a hydraulic pressure $p_{act}$ in the hydraulic actuator and a hydraulic pressure $p_{accu}$ in the hydraulic accumulator assembly is smaller than a predetermined pressure difference and if a movable member of the hydraulic actuator is intended to be moved, fluidly connecting the hydraulic accumulator assembly with the hydraulic actuator and displacing fluid from the hydraulic actuator to the hydraulic accumulator assembly so that the hydraulic accumulator assembly absorbs energy from the hydraulic actuator; and
selectively applying a hydraulic pressure on the pressure-actuatable actuator of the overcenter valve via a hydraulically actuatable control mechanism and applying the hydraulic pressure based at least on a hydraulic pressure in the hydraulic accumulator assembly.

* * * * *